(12) United States Patent
Gerstler et al.

(10) Patent No.: US 10,830,141 B2
(45) Date of Patent: Nov. 10, 2020

(54) RECUPERATOR FOR GAS TURBINE ENGINE

(71) Applicant: General Electric Company, Schenectady, NY (US)

(72) Inventors: William Dwight Gerstler, Niskayuna, NY (US); Daniel Jason Erno, Clifton Park, NY (US); Brian Lewis Devendorf, Georgetown, MA (US); Kevin Kenneth Pruzinsky, Lynn, MA (US)

(73) Assignee: General Electric Company, Schenectady, NY (US)

( * ) Notice: Subject to any disclaimer, the term of this patent is extended or adjusted under 35 U.S.C. 154(b) by 273 days.

(21) Appl. No.: 15/843,260

(22) Filed: Dec. 15, 2017

(65) Prior Publication Data

US 2019/0186361 A1    Jun. 20, 2019

(51) Int. Cl.
| | | |
|---|---|---|
| *F02C 7/10* | (2006.01) | |
| *F02C 7/08* | (2006.01) | |
| *F02C 3/04* | (2006.01) | |
| *F28D 21/00* | (2006.01) | |

(52) U.S. Cl.
CPC .............. *F02C 7/10* (2013.01); *F02C 3/04* (2013.01); *F02C 7/08* (2013.01); *F28D 21/0003* (2013.01); *F05D 2220/32* (2013.01); *F05D 2230/53* (2013.01); *F05D 2250/38* (2013.01); *F05D 2250/71* (2013.01); *F05D 2260/221* (2013.01); *F28D 2021/0026* (2013.01)

(58) Field of Classification Search
CPC .............. F02C 7/10; F02C 7/105; F02C 7/08
See application file for complete search history.

(56) References Cited

U.S. PATENT DOCUMENTS

| | | | |
|---|---|---|---|
| 6,092,361 A | 7/2000 | Romani | |
| 6,634,176 B2 * | 10/2003 | Rouse | F01D 25/30 |
| | | | 60/39.511 |
| 8,721,981 B2 | 5/2014 | Freund | |
| (Continued) | | | |

FOREIGN PATENT DOCUMENTS

DE        2240071 A1    2/1974

OTHER PUBLICATIONS

International Search Report regarding International Application No. PCT/US2018/061737 dated Feb. 15, 2019; pp. 1-3.

*Primary Examiner* — Gerald L Sung
*Assistant Examiner* — Rene D Ford
(74) *Attorney, Agent, or Firm* — Armstrong Teasdale LLP

(57) ABSTRACT

A recuperator includes a monolithic heat exchanger core having a first side proximal to a combustor inlet and a turbine outlet, and a second side that includes an exhaust outlet. A compressed air inlet is located on the second side, and a compressed air outlet is located on the first side. The compressed air outlet supplies air to a combustor. A first plurality of passageways connects the compressed air inlet to the compressed air outlet. A turbine exhaust inlet is located on the first side, and a turbine exhaust outlet is located on the second side. A second plurality of passageways connects the turbine exhaust inlet to the turbine exhaust outlet. The first and second plurality of passageways are defined by parting plates that extend radially outward in a spiral pattern that maintains a substantially equal distance between adjacent parting plates.

20 Claims, 9 Drawing Sheets

(56) References Cited

U.S. PATENT DOCUMENTS

| | | | |
|---|---|---|---|
| 9,068,506 B2 | 6/2015 | Eleftheriou | |
| 9,388,741 B2 | 7/2016 | Gekht | |
| 9,394,828 B2 | 7/2016 | Eleftheriou | |
| 10,450,956 B2 * | 10/2019 | Schmitz | F28F 13/08 |
| 10,502,424 B2 * | 12/2019 | Monty | F23R 3/14 |
| 2001/0052231 A1 | 12/2001 | Ryan | |
| 2002/0073688 A1 * | 6/2002 | Bosley | F02C 3/05 |
| | | | 60/39.511 |
| 2002/0124569 A1 * | 9/2002 | Treece | F02C 7/08 |
| | | | 60/772 |
| 2004/0118101 A1 | 6/2004 | Dewis | |
| 2005/0235626 A1 | 10/2005 | Hull et al. | |
| 2010/0293946 A1 | 11/2010 | Vick | |
| 2011/0097189 A1 * | 4/2011 | Sandoval | F01D 1/36 |
| | | | 415/68 |
| 2017/0234315 A1 | 8/2017 | Hammound | |
| 2018/0066583 A1 * | 3/2018 | Menheere | F02C 3/04 |

* cited by examiner

RECUPERATOR FOR GAS TURBINE ENGINE

BACKGROUND OF THE INVENTION

The apparatus described herein relates generally to recuperators for gas turbine engines and, more specifically, to a recuperator having a monolithic heat exchanger.

The potential benefits of recovering waste heat from a combustion engine are a well-known aspect of engine thermodynamic performance. However, waste heat recovery requires additional components and system complexity that must be considered to determine the overall benefit to the engine. One method of waste heat recovery is the addition of a recuperating heat exchanger to transfer exhaust waste heat to the pre-combustion compressed air. The addition of heat to the pre-combustion air reduces the amount of fuel needed to obtain the desired pressure that provides the engine work extraction potential. However, a recuperating heat exchanger adds mass and volume to the engine, which is the primary reason that recuperators are relatively common in ground based power generation, but rare in aviation applications. The heat exchanger and its associated manifolding also create a pressure drop in the engine airflow. Mass, volume, and working fluid pressure drop all decrease the benefits of the waste heat recovery. Moreover, the additional component adds to the engine cost.

BRIEF DESCRIPTION OF THE INVENTION

In an aspect of the present invention, a recuperator includes a monolithic heat exchanger core having a first side proximal to a combustor inlet and a turbine outlet, and a second side opposed to the first side. The second side includes an exhaust outlet. A compressed air inlet is located on the second side and at a radially outer portion of the heat exchanger core. A compressed air outlet is located on the first side and at a radially outer portion of the heat exchanger core. The compressed air outlet supplies air to a combustor. A first plurality of passageways connects the compressed air inlet to the compressed air outlet. A turbine exhaust inlet is located on the first side and at a radially inner portion of the heat exchanger core. A turbine exhaust outlet is located on the second side and at a radially inner portion of the heat exchanger core. A second plurality of passageways connects the turbine exhaust inlet to the turbine exhaust outlet. The first plurality of passageways and the second plurality of passageways are defined by parting plates that extend radially outward in a spiral pattern that maintains a substantially equal distance between adjacent parting plates, and each of the first plurality of passageways is adjacent to one of the second plurality of passageways.

In another aspect of the present invention, a gas turbine engine includes a compressor, a combustor fluidly connected with the compressor, and a turbine fluidly connected with the combustor. A recuperator is fluidly connected to the compressor, the combustor and the turbine. The recuperator includes a monolithic heat exchanger core having a first side proximal to a combustor inlet and turbine outlet, and a second side opposed to the first side. The second side includes an exhaust outlet. A compressed air inlet is located on the second side and at a radially outer portion of the heat exchanger core. A compressed air outlet is located on the first side and at a radially outer portion of the heat exchanger core. The compressed air outlet supplies air to a combustor. A first plurality of passageways connects the compressed air inlet to the compressed air outlet. A turbine exhaust inlet is located on the first side and at a radially inner portion of the heat exchanger core. A turbine exhaust outlet is located on the second side and at a radially inner portion of the heat exchanger core. A second plurality of passageways connect the turbine exhaust inlet to the turbine exhaust outlet. The first plurality of passageways and the second plurality of passageways are defined by parting plates that extend radially outward in a spiral pattern that maintains a substantially equal distance between adjacent parting plates. Each of the first plurality of passageways is adjacent to one of the second plurality of passageways.

In yet another aspect of the present invention, a heat exchanger includes a monolithic heat exchanger core having a first side and a second side opposed to the first side. A first inlet is located on the second side and at a radially outer portion of the heat exchanger core, and a first outlet is located on the first side and at a radially outer portion of the heat exchanger core. A first plurality of passageways connects the first inlet to the first outlet. A second inlet is located on the first side and at a radially inner portion of the heat exchanger core, and a second outlet is located on the second side and at a radially inner portion of the heat exchanger core. A second plurality of passageways connects the second inlet to the second outlet. The first plurality of passageways and the second plurality of passageways are defined by parting plates that extend radially outward in a spiral pattern that maintains a substantially equal distance between adjacent parting plates. Each of the first plurality of passageways is adjacent to one of the second plurality of passageways.

DETAILED DESCRIPTION OF THE INVENTION

Figure 1:
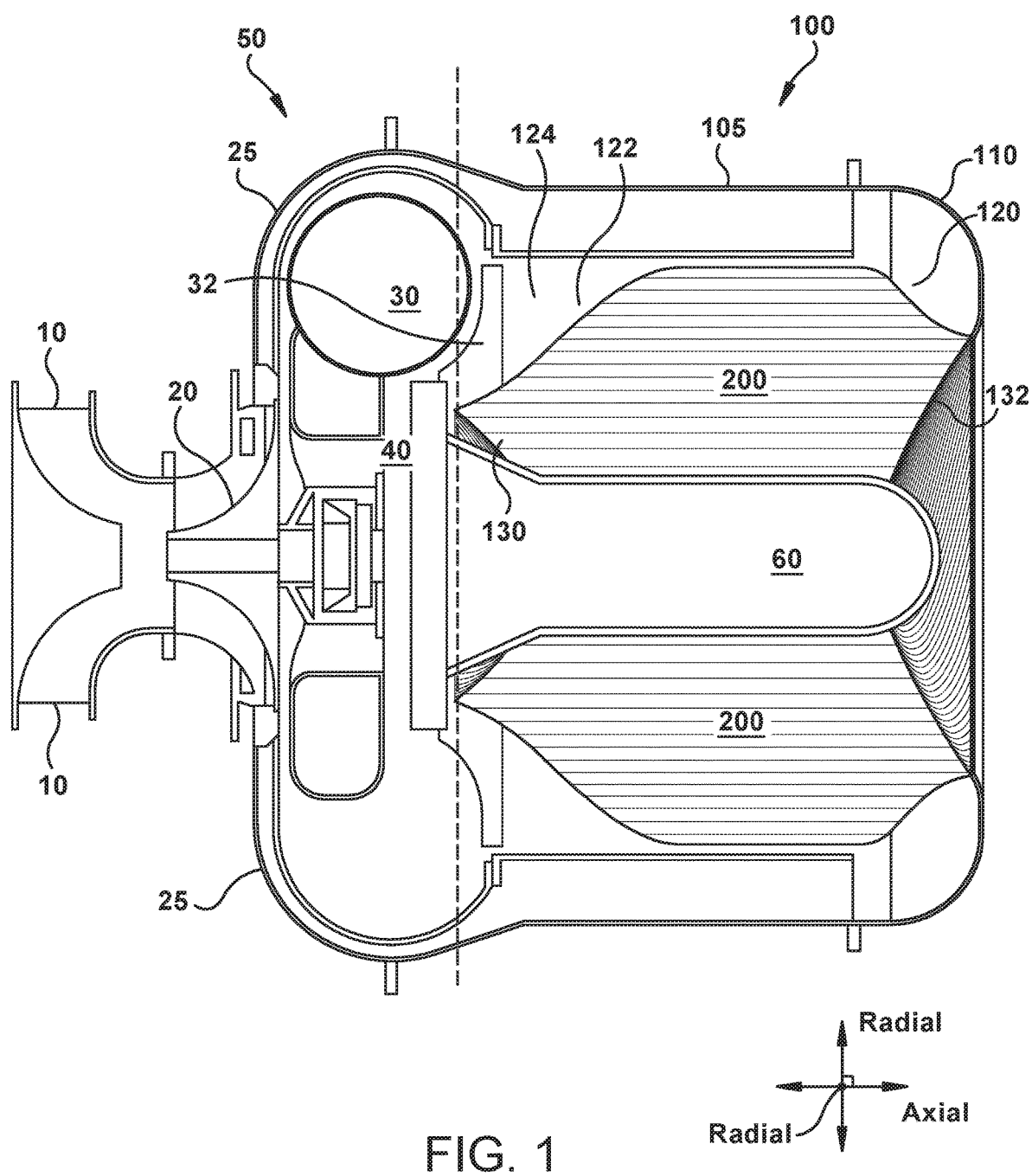
FIG. 1 illustrates a cross-sectional view of a recuperator in an axial-radial plane, where the recuperator is integrated into the aft portion of a gas turbine engine, according to an aspect of the present disclosure.

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," and "the" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features. The terms, axial, axially, radial, radially, upstream, downstream, fore and aft are with respect to the gas turbine engine and recuperator. For example, the fore and aft direction are separated along the axial axis, as are the upstream and downstream directions. Radially inward is closer to the axial centerline than a radially outward location. Like reference numbers in the various figures indicate like elements.

The primary purpose of a heat exchanger is to move energy from one fluid stream to another fluid stream, with heat being the form of energy moved. The second law of thermodynamics dictates that heat energy always moves from hot to cold, with driving potential being temperature difference. The first law of thermodynamics dictates that the energy lost from one fluid stream is the amount of energy gained by the second fluid stream (after accounting for any losses outside the system). While thermodynamics dictates the fundamental direction and quantity of heat transferred, the heat exchanger design is determined by flow configuration, heat transfer rates, and fluid pressure losses.

An engine recuperator in its simplest form reduces the possible input variables for a heat exchanger design. That is, the two fluid streams are of the same type, and the mass flow through each side of the heat exchanger is nearly the same. High performance turbine engines do include a small amount of compressor air that is used for turbine cooling. This relatively small amount of air will by-pass the recuperator cold side flow passages. It is possible to introduce additional flow by-pass systems into the design and/or use intermediary fluids to recuperate engine heat, both of which add system complexity. But for the purposes of this engine, a simpler approach is proposed. Furthermore, since the working fluid is air, and the specific heat of air is relatively constant over wide temperature and pressure ranges, the overall heat capacity rate C, for each fluid, is approximately the same. It is true that the exhaust gas includes additional mass flow due to the addition of the fuel mass flow, and that the combustion effluent has different fluid properties than the compressor air. However, for the purposes of conceptual heat exchanger design the effect of the fuel mass flow is considered but the combustion gas composition effect on air properties is ignored.

The heat capacity rate is defined as the product of the mass flowrate and specific heat. There are implications to flow configuration when the two fluid streams have nearly the same heat capacity rate. The ratio of the minimum to maximum heat capacity rate is $C^*$, the ratio of heat capacity rates. When $C^*$ is at or near 1, flow configuration type has a significant effect on heat exchanger design at high heat exchanger effectiveness. For example, when $C^*$ is 1, the maximum possible effectiveness of a parallel flow heat exchanger is 50%. For the same configuration with a $C^*$ value approaching 0, the effectiveness can reach close to 100%. A counterflow heat exchanger can reach effectiveness of close to 100% regardless of the value of $C^*$.

A high conductance relates to a larger and heavier heat exchanger if fluid flow and pressure drop is held constant. A fluid is considered "unmixed" if a set of fins or plates keeps the fluid contained throughout the heat exchanger length. A plate-fin surface and the interior of tubes are examples of a "unmixed" arrangements. A fluid is considered "mixed" if the geometry allows the fluid to disperse and mix throughout the heat exchanger length. The flow exterior to an unfinned tube bank is an example of a "mixed" flow arrangement.

A counterflow configuration requires only 60% of the conductance required of a cross-flow configuration with both fluids unmixed. Thus, a counterflow configuration based heat exchanger will be smaller and lighter under the same flow conditions. Multi-pass shell and tube configurations become closer and closer to a counterflow configuration as more passes are added. Like shell and tube, multi-pass cross-flow configurations also converge towards counterflow, but multiple passes add volume, mass, and pressure drop. The flow arrangement choice with the greatest promise for an aviation recuperator is counterflow. While counterflow always results in a lower required conductance, other flow configurations, such as cross-flow, are often used in industry because of conventional manifolding and manufacturing considerations.

For system benefit, the heat exchanger should meet the desired conductance value while having a low mass, volume, and pressure drop. However, the heat transfer and fluid dynamics physics dictates that reducing mass and volume requires increasing pressure drop. Several heat exchanger core models were used to explore the design space to find the combination of heat exchanger effectiveness, mass, volume, and pressure drop that provides maximum engine performance. A plate-fin core adapted to the engine exhaust shape was the final selection.

Because the inventive heat exchanger is monolithically built by additive manufacturing, there is significant opportunity for heat transfer to occur as the two fluid streams are guided from their supply duct/area to the heat exchanger core and from the heat exchange core to the discharge duct/area. To move fluid to and from the heat exchanger core, conventional manufacturing typically requires supply and discharge manifolds and plenums that use volume but do not provide opportunity for heat exchange. A heat transfer analysis was completed to quantify how much heat transfer occurs in the manifold areas. For example, the length of the heat exchanger core can be shortened by about 25%. A shorter heat exchanger core weighs less than a longer heat exchanger core. The monolithic aspect of the heat exchanger also eliminates the many brazed joints and seam required in a non-additively manufactured heat exchanger. Brazed joints and seams are typically the first to fail or leak in engines of this type.

The average cross-sectional area and the average length for each manifold "chute" between the respective hot and cold side supply and discharge areas were used to calculate the manifold heat transfer. The parting plates separate the "chutes." The dimensions were determined using solid model geometry. A heat transfer model was used to calculate the conductance value for the manifold heat transfer that occurs at both the turbine end and exhaust end of the heat exchanger. On the turbine end, the turbine exhaust air is guided from the turbine exit to the heat exchanger core and exchanges heat with the compressor air exiting the heat exchanger core as it is guided to the combustor inlet plenum. On the exhaust end, the turbine exhaust air is guided from the heat exchanger core to the ambient and exchanges heat with the compressor air being guided from the compressor air annular duct to the heat exchanger core. A model combining the effects of the two manifold sections and core show the heat exchanger core length can be reduced by 25% while maintaining the same overall recuperator effectiveness and conductance value. In this example, the heat exchanger core mass is also reduced by 25%.

FIG. 1 illustrates a cross-sectional view of the recuperator 100 in an axial-radial plane, and where the recuperator is integrated into the aft portion of a gas turbine engine 50. The engine 50 and recuperator 100 are roughly separated by the vertical dotted line in FIG. 1. The dashed arrows refer to the cold side (or compressed) air flow path, and the dash-dot arrows refer to the hot side airflow (or turbine exhaust) path. Air enters through engine inlet 10 and is routed to centrifugal compressor 20. The flow exits the compressor 20 in a radially outward direction and continues radially along the fore side of the engine casing 25. The compressed air flow turns around the combustor 30 until it obtains a radial distance that allows it to turn axially to flow around the combustor 30. The compressed air, guided by outer casing 105, continues around the combustor 30 and moves axially to the aft of the recuperator 100. The compressed airflow then turns radially inward as guided by outer casing 110 it enters the compressed air inlet 120 of the monolithic heat exchanger core 200. The compressed air inlet 120 has spiral shaped plates that guide the flow towards the heat exchanger core 200. The compressed air passes in the forward axial direction (right to left) in FIG. 1) between finned parting plates that are also spiral shaped. At the compressed air outlet 122 of the heat exchanger core 200, the compressed air is directed by a cold side exit manifold 124 to a radially outward area of the combustor inlet plenum 32. The manifold 124 transitions from the spiral shape of the core to the annular shape of the combustor inlet plenum 32. The flow then goes through the combustion and expansion processes in the combustor 30 and turbine 40. Flow exits the turbine 40 and enters the turbine exhaust inlet 130 of the heat exchanger core 200. The turbine exhaust inlet 130 is radially inward of the compressed air outlet, but transitions to the full annulus shape of the heat exchanger core. Similar to the compressed air inlet 120, the turbine exhaust inlet 130 also has spiral shaped plates that guide the exhaust flow towards the heat exchanger core 200. The hot exhaust gases then pass through the heat exchanger core 200 in the axially aft direction (left to right in FIG. 1) between finned parting plates that are spiral shaped. The turbine exhaust exits the heat exchanger core 200 through the turbine exhaust outlet 132 straight out the aft of the recuperator 100.

The recuperator 100 includes a monolithic heat exchanger core 200 that is formed by additive manufacturing, 3D printing, direct metal laser melting (DMLM), laser sintering or other additive manufacturing methods that reduce or eliminate brazed joints in the heat exchanger core 200. A first side of the heat exchanger core is the upstream side that is proximal to the combustor inlet plenum 32 and turbine 40. A second side of the heat exchanger core 200 is located on the downstream or aft side and includes the exhaust outlet 132, and the second side is generally opposed to the first side. The first side includes the compressed air outlet 122 and the turbine exhaust inlet 130, while the second side includes the compressed air inlet 120 and the turbine exhaust outlet 132. A central cone 60 is located radially inside of the heat exchanger core 200. The recuperator 100 may also be referred to as a heat exchanger, and may be used without engine 50 or with different attachments.

The compressed air inlet 120 is located at a radially outer portion of the heat exchanger core 200. The surface of the compressed air inlet 120 is tapered in an axial-radial plane by about 45 degrees. For example, the radially outer passageways have a shorter axial length than more radial inner passageways. The compressed air outlet 122 is also tapered in the axial-radial plane by about a 45 degree angle, so that the two 45 degree angled surfaces are roughly 90 degrees apart. For example, the angle of the compressed air inlet 120 surface may be −45 degrees, while the angle of compressed air outlet 122 is +45 degrees, with respect to a radial axis placed on axially outward points thereof. If desired for specific applications, the taper angle may range from about 30 degrees to about 60 degrees (and all subranges therebetween) in the axial-radial plane.

Figure 2:
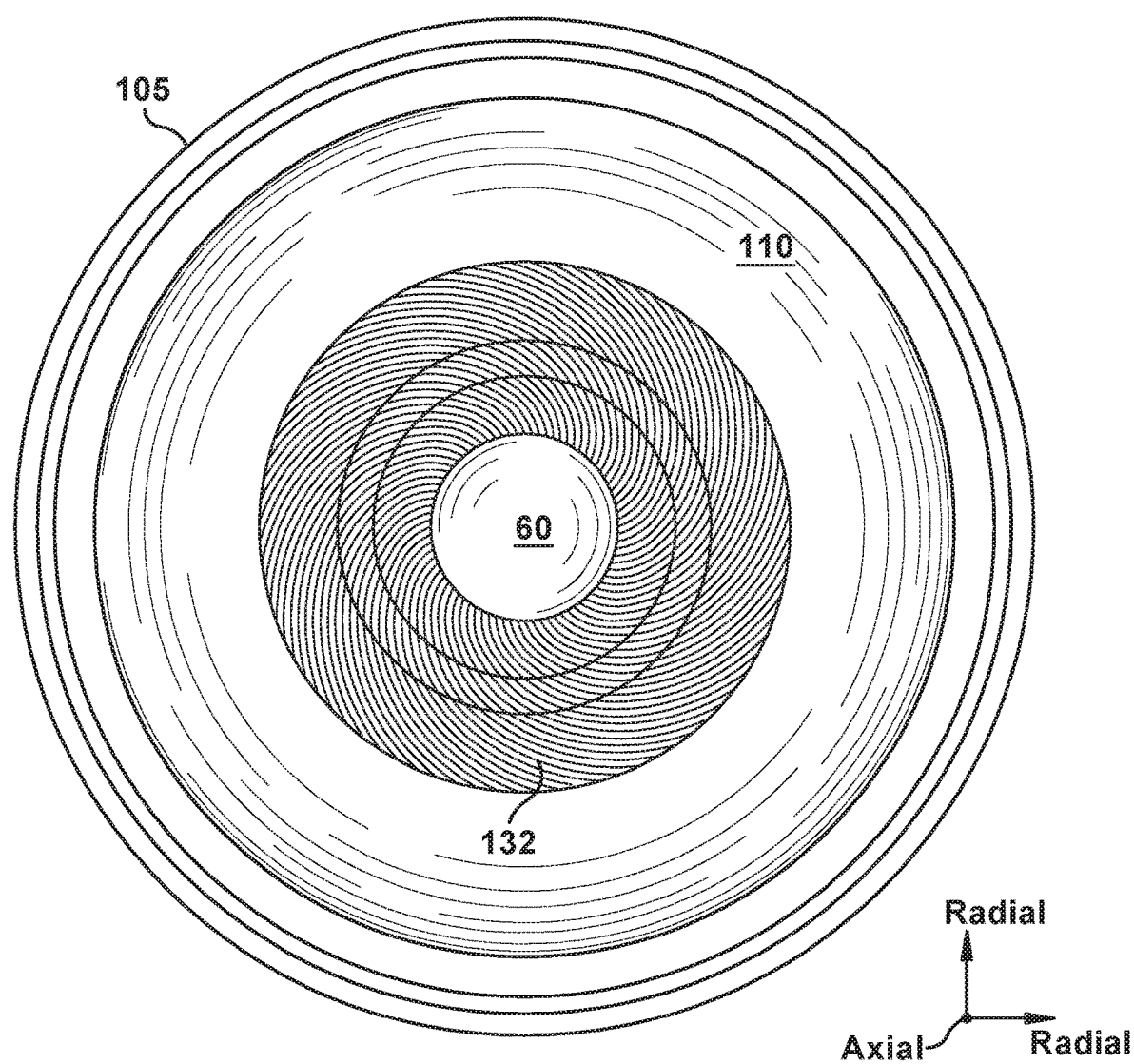
FIG. 2 illustrates an aft or rear view of the gas turbine engine and recuperator, according to an aspect of the present disclosure.

FIG. 2 illustrates an aft or rear view of the engine 50 and recuperator 100 looking forward. The outer casing 105 is the projected annulus of the compressor's air inlet duct. Outer casing 110 forms a plenum and manifold area for the compressed air inlet 120. The spiral plate section between the central cone 60 and the outer casing 110 is the turbine exhaust outlet 132.

Figure 3:
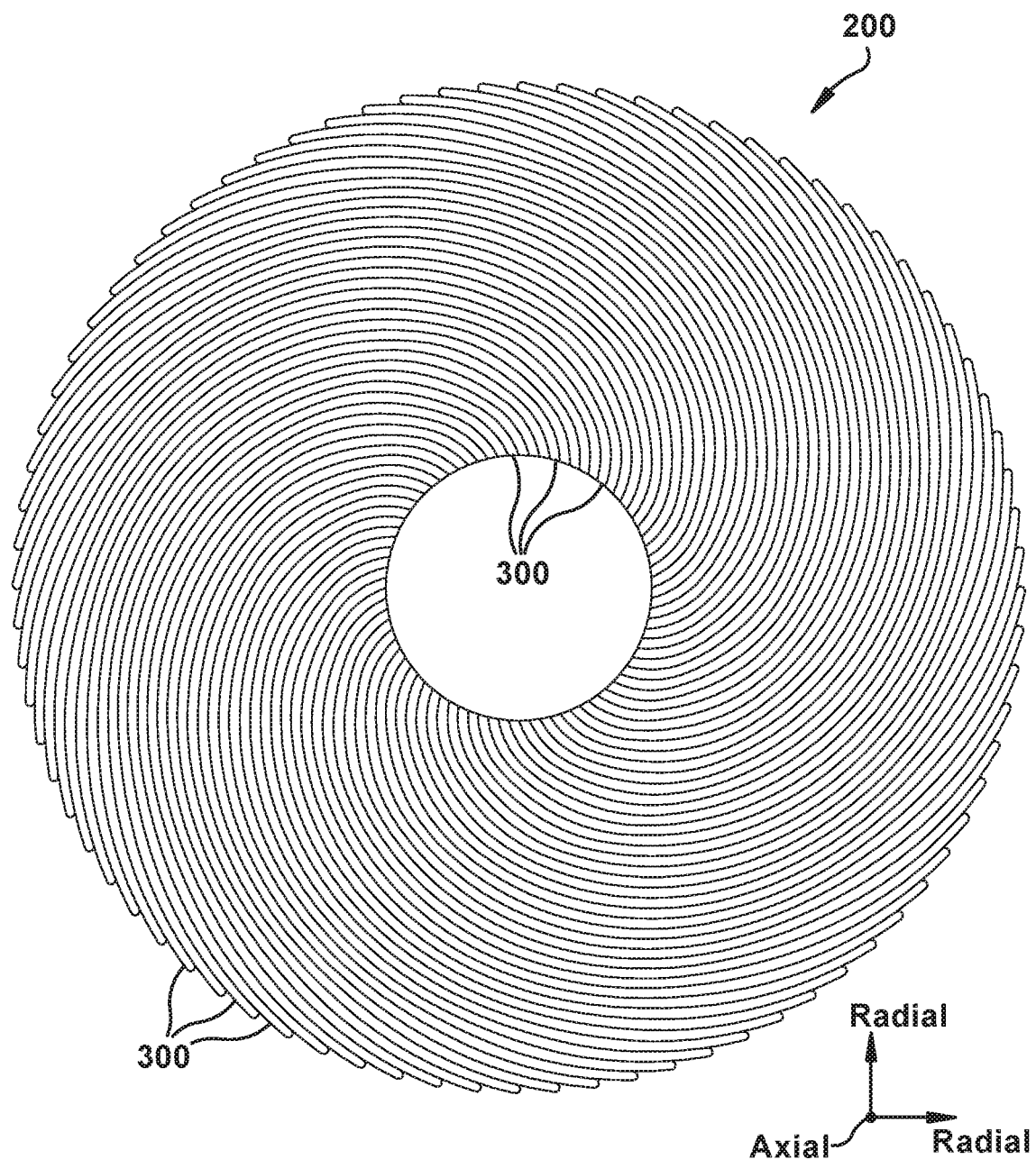
FIG. 3 illustrates a cross-sectional view of the heat exchanger core in a radial plane, according to an aspect of the present disclosure.

FIG. 3 illustrates a cross-sectional view of the heat exchanger core 200. The spiral arms are the parting plates 300 and the spaces between the parting plates 300 are passageways for the compressed air flow and the turbine exhaust flow. The shape of the spiral is such that the distance between two adjacent plates can be maintained at a constant interval or distance. There are advantages to flow distribution and irreversible losses related to flow acceleration and deceleration when maintaining a constant distance between parting plates 300.

Figure 4:
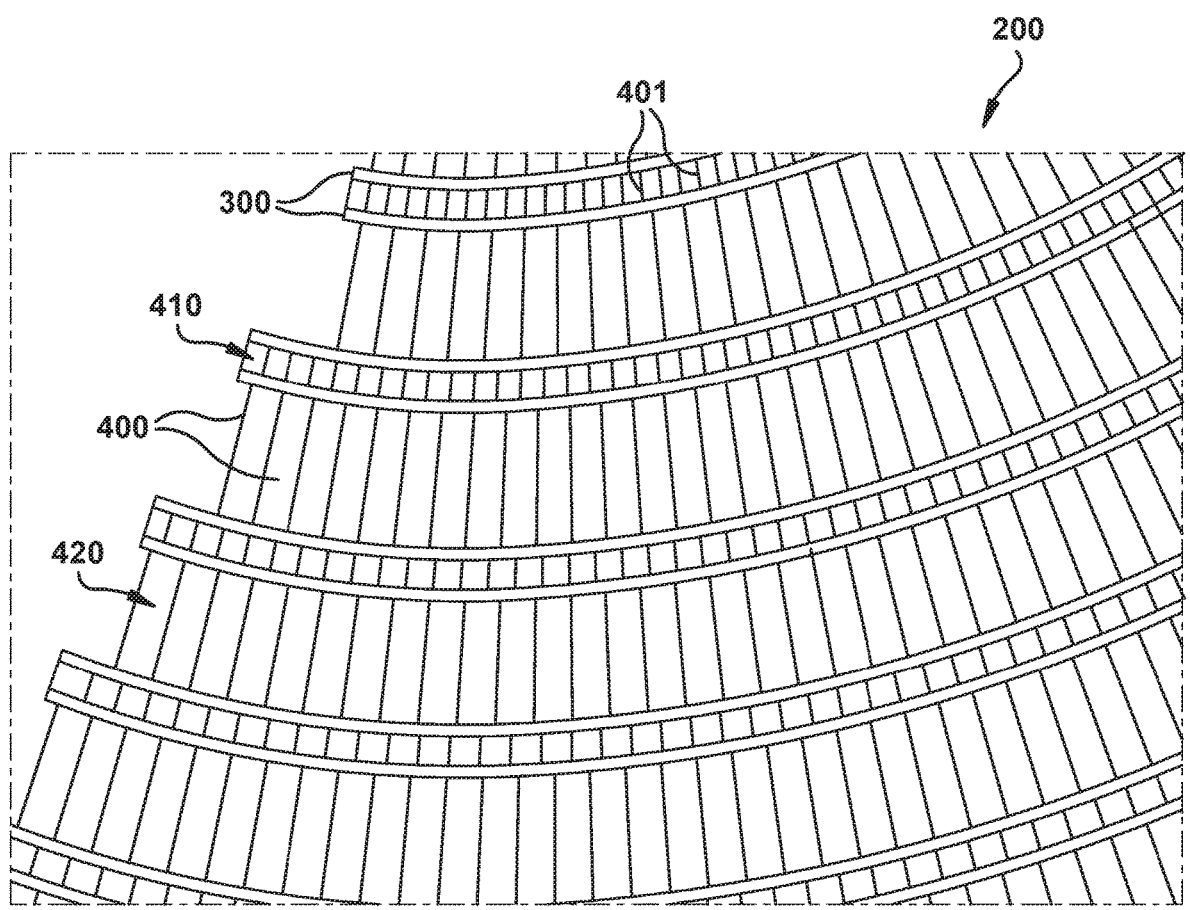
FIG. 4 illustrates an enlarged and partial, cross-sectional view of the parting plates and fins, according to an aspect of the present disclosure.

FIG. 4 illustrates an enlarged view of the parting plates 300 and fins 400. The parting plates 300 are thicker than the fins 400. The parting plates may be about 0.012 inches thick, and formed of aluminum, titanium 6-4, Inconel 718, or a cobalt chrome alloy. Other materials may be used as well if they have similar and/or satisfactory performance attributes. A heat exchanger built of these materials with about 0.012 inch thick walls successfully passed helium leak checks, and showed no measurable leakage between fluid sides. The fins 400 may be about 0.006 inches thick or less. The fins 400 can be thinner than the parting plates because they do not have to be leak free. The fluid on the other side of the fin surface will be from the same fluid stream, as it will be approximately the same temperature and pressure, thus there will be no driving force to move the fluid between fins.

A first plurality of passageways 410 are defined by adjacent and closely spaced parting plates 300 and fins 401, and these passageways transport compressed air from the compressor. A second plurality of passageways 420 are defined by adjacent but widely spaced parting plates 300 and fins 400, and these passageways transport turbine exhaust gasses. The cross-sectional area of each individual first passageway 410 is smaller than the cross-sectional area of each individual second passageway 420, as the denser and cooler compressed airflow requires less volume than the hot exhaust gasses from the turbine. The relatively cold compressed air is significantly denser due to both a lower temperature and higher pressure compared to the turbine exhaust gas flow. To maintain a relatively equal ΔP/P for hot/turbine and cold/compressor side, the free flow areas are designed so that the flow velocity is approximately the same. However, the flow velocity can be different if desired in a specific application.

The thermal transfer between the fins 400, 401 and parting plates 300 is excellent in transferring heat from the turbine exhaust gas to the compressed airflow going to the combustor. In addition, the heat exchanger core is in a counter-flow configuration so that compressed air flow and turbine exhaust flow travel in opposite directions. For example in FIG. 4, compressed airflow travels into the page through passageways 410, and the turbine exhaust flow travels out of the page through passageways 420. The fins 400, 401 are normal or at right angles to the walls of the parting plates 300.

Figure 5:
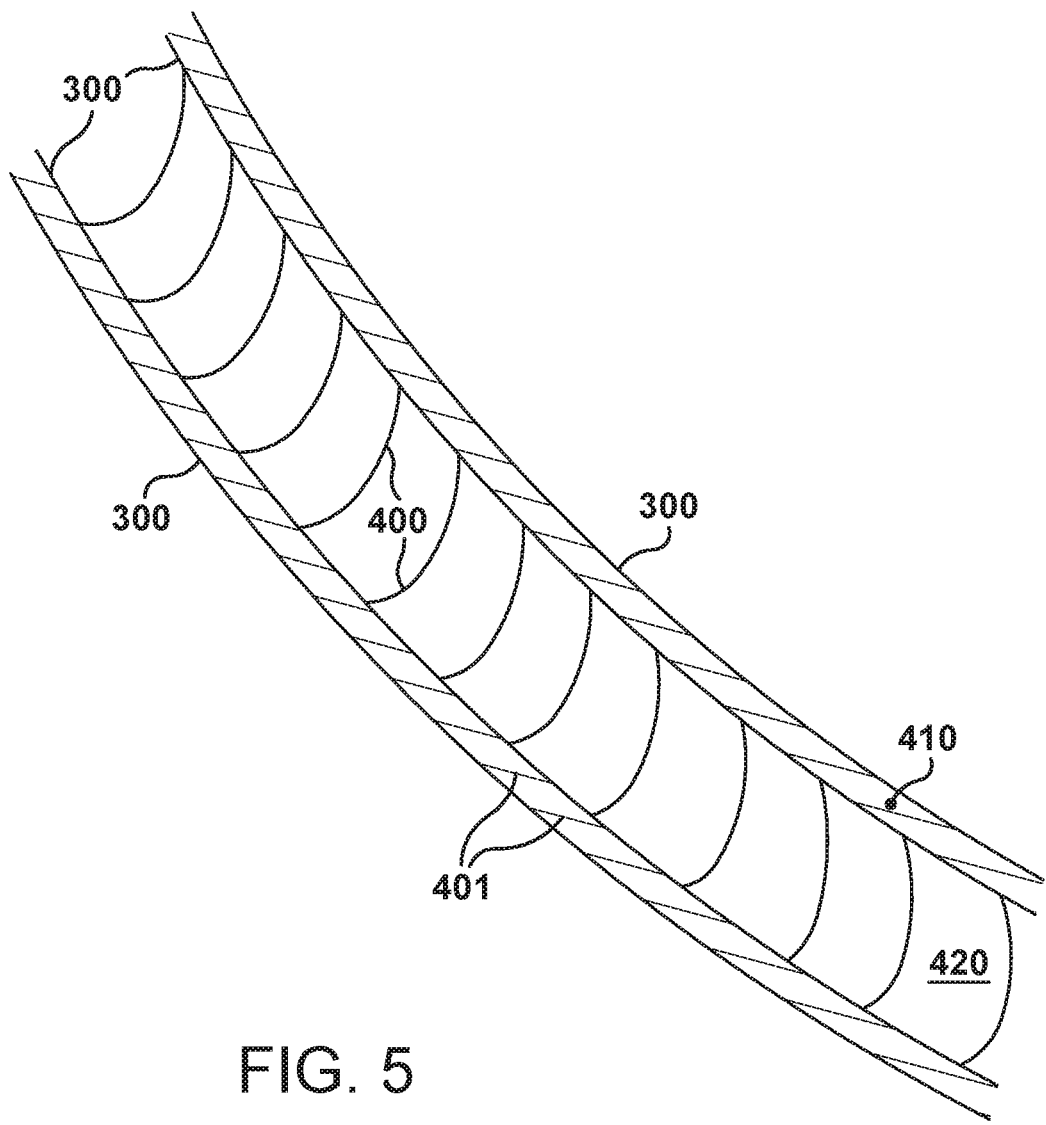
FIG. 5 illustrates an enlarged, partial cross-sectional view of the parting plates and fins, according to an aspect of the present disclosure, according to an aspect of the present disclosure.

FIG. 5 illustrates an enlarged, partial view of the parting plates and fins, according to an aspect of the present disclosure. To increase the surface area of the fins 400, 401 and thereby increase the thermal transfer capability, the fins may be angled or curved with respect to the parting plates. Fins 400, which define the second plurality of passageways 420 may be curved so that they comprise a variable angle with a curved surface (as shown) or they can be configured to be straight and formed an acute or obtuse angle to the parting plates. Fins 401, which define the first plurality of passageways 410 may be curved so that they comprise a variable angle with a curved surface, or they can be configured to be straight and form an acute or obtuse angle (as shown) to the parting plates. In selecting any single fin 401, it will be seen that on one side of the fin an acute angle is formed with the parting plate, and the supplementary angle (on the opposing side) is an obtuse angle. Fin configurations as shown in FIG. 5 increase the length (and surface area) of the fins, and the fins may be angled/curved in opposing directions as well.

Figure 6:
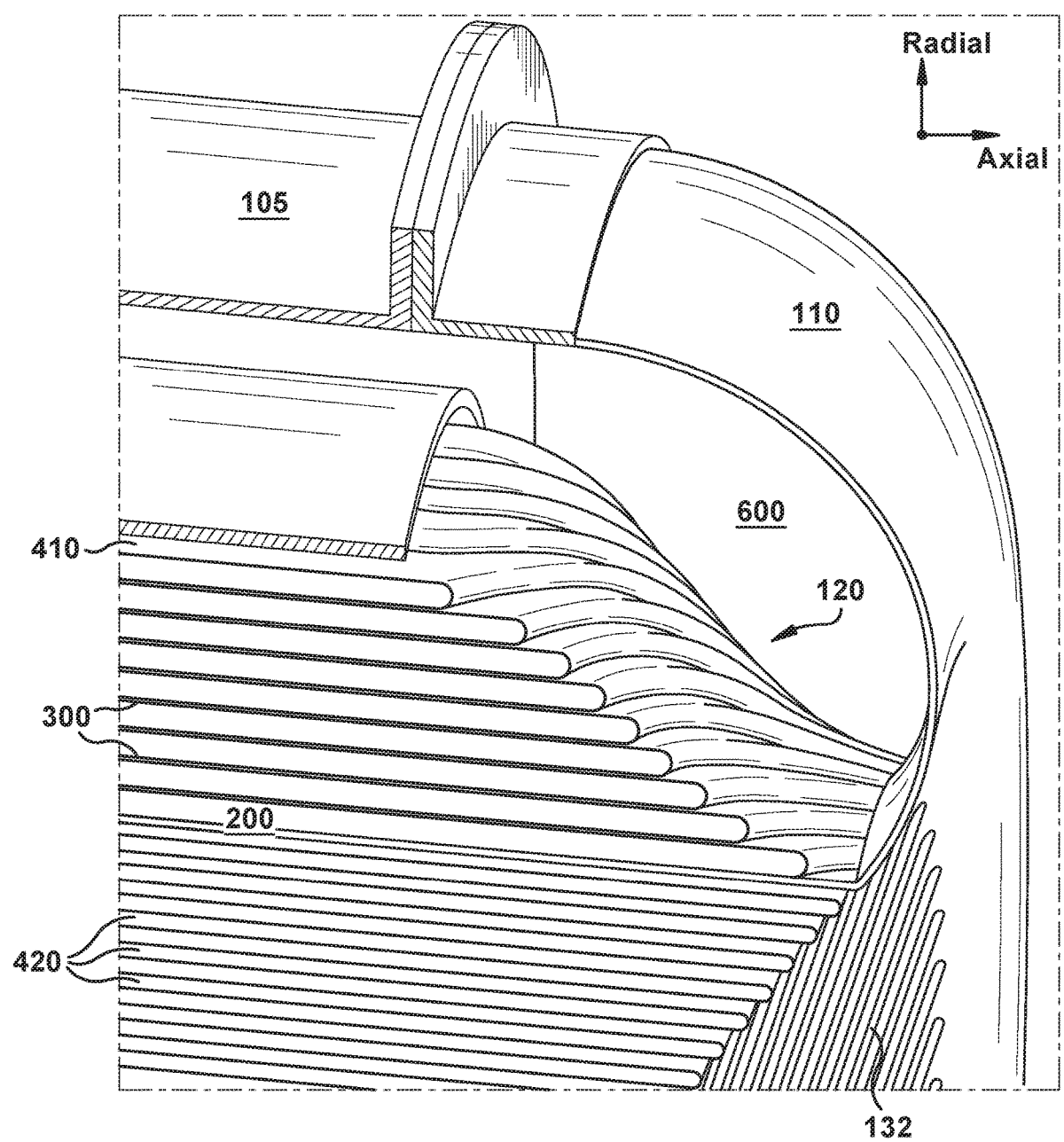
FIG. 6 illustrates an enlarged, perspective cut-away view of the compressed air inlet, according to an aspect of the present disclosure.

FIG. 6 illustrates an enlarged view of the compressed air inlet 120 area that feeds passageways 410. An annular plenum 600 is formed at the far (or axially rear) end of the compressor discharge annulus. The plenum 600 allows the compressed air from the compressor to turn radially inward towards the compressed air inlet 120. The compressed air inlet 120 is an axial extension of the heat exchanger core's spiral walls, with a taper of approximately 45 degrees in an axial-radial plane. The compressed air passes through the parting plates 300 (with fins omitted for clarity in FIG. 6) and distributes to the heat exchanger core 200. Some of the parting plates are adjacent to the exiting hot turbine air, and this provides additional heat exchanger function beyond the core of the heat exchanger. Hot turbine exhaust exits through passageways 420 and subsequently out of exhaust outlet 132. The outer casings 105, and portions of 110 are located radially outward of the heat exchanger core 200, and the outer casings direct compressed air axially aft and then radially inward to the compressed air inlet 120.

Figure 7:
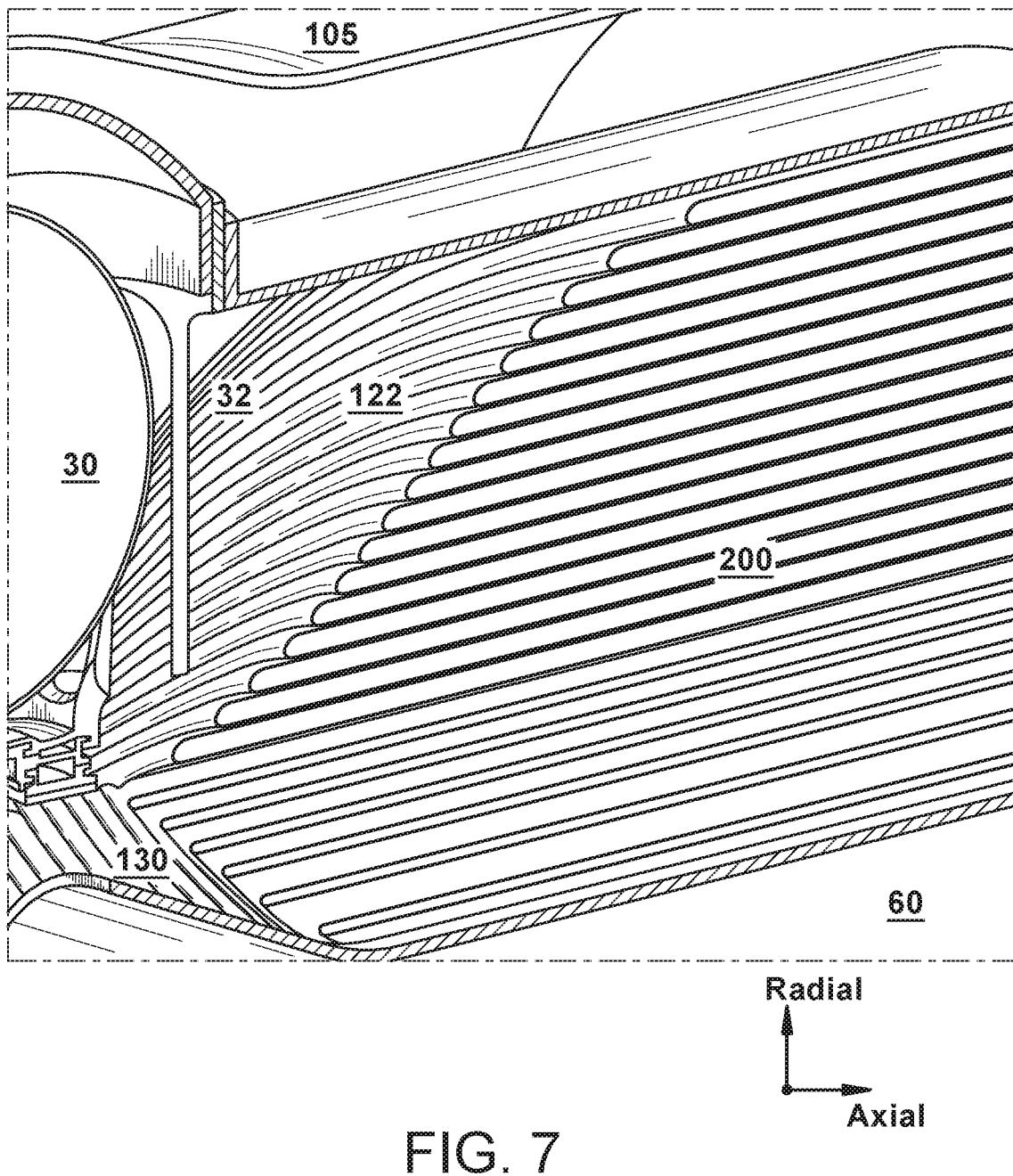
FIG. 7 illustrates an enlarged, perspective cut-away view of the compressed air outlet, according to an aspect of the present disclosure.

FIG. 7 illustrates an enlarged view of the compressed air outlet 122. An annular plenum is formed by the combustor inlet plenum 32 The plenum 32 allows the compressor air exiting the heat exchanger core 200 to surround the combustor 30 and enter it in a desired manner. The combustor inlet plenum 32 guides the compressed air flow from the heat exchanger core 200 exiting compressed air outlet 122 to the combustor 30. The compressed air outlet 122 is an axial extension of the heat exchanger core spiral walls, with a taper of approximately 45 degrees in an axial-radial plane. The compressed air exits through parting plates and is subsequently distributed to the combustor inlet plenum 32. Some of the parting plates are adjacent to the exiting hot turbine air, and this provides additional heat exchanger function beyond the core of the heat exchanger.

Figure 8:
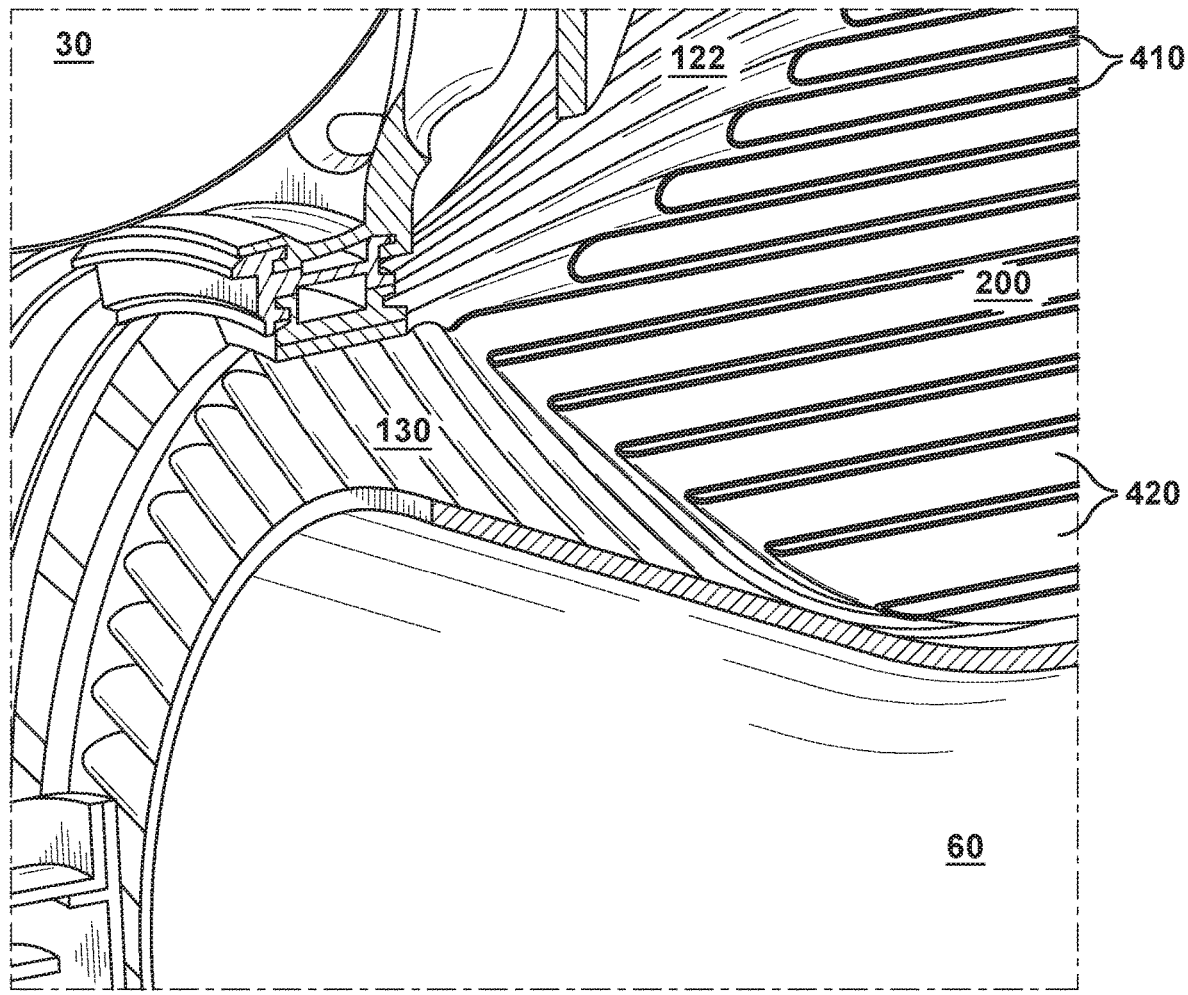
FIG. 8 illustrates an enlarged, perspective cut-away view of the turbine exhaust inlet for gas exiting the turbine section, according to an aspect of the present disclosure.

FIG. 8 illustrates an enlarged view of the turbine exhaust inlet 130 for fluid/gas exiting the turbine section. The turbine exhaust exits in an annular area that feeds a small plenum at the entrance to the hot side manifold or turbine exhaust inlet 130. The plenum allows the turbine exhaust to transition to the turbine exhaust inlet 130. The turbine exhaust inlet 130 is an axial extension of the heat exchanger core spiral walls, with a taper of approximately 45 degrees in an axial-radial plane. The turbine exhaust passes along the parting plates and through the heat exchanger core 200. Part of the manifold walls are adjacent to the exiting compressor air, and this provides additional heat exchanger function beyond the core of the heat exchanger.

Figure 9:
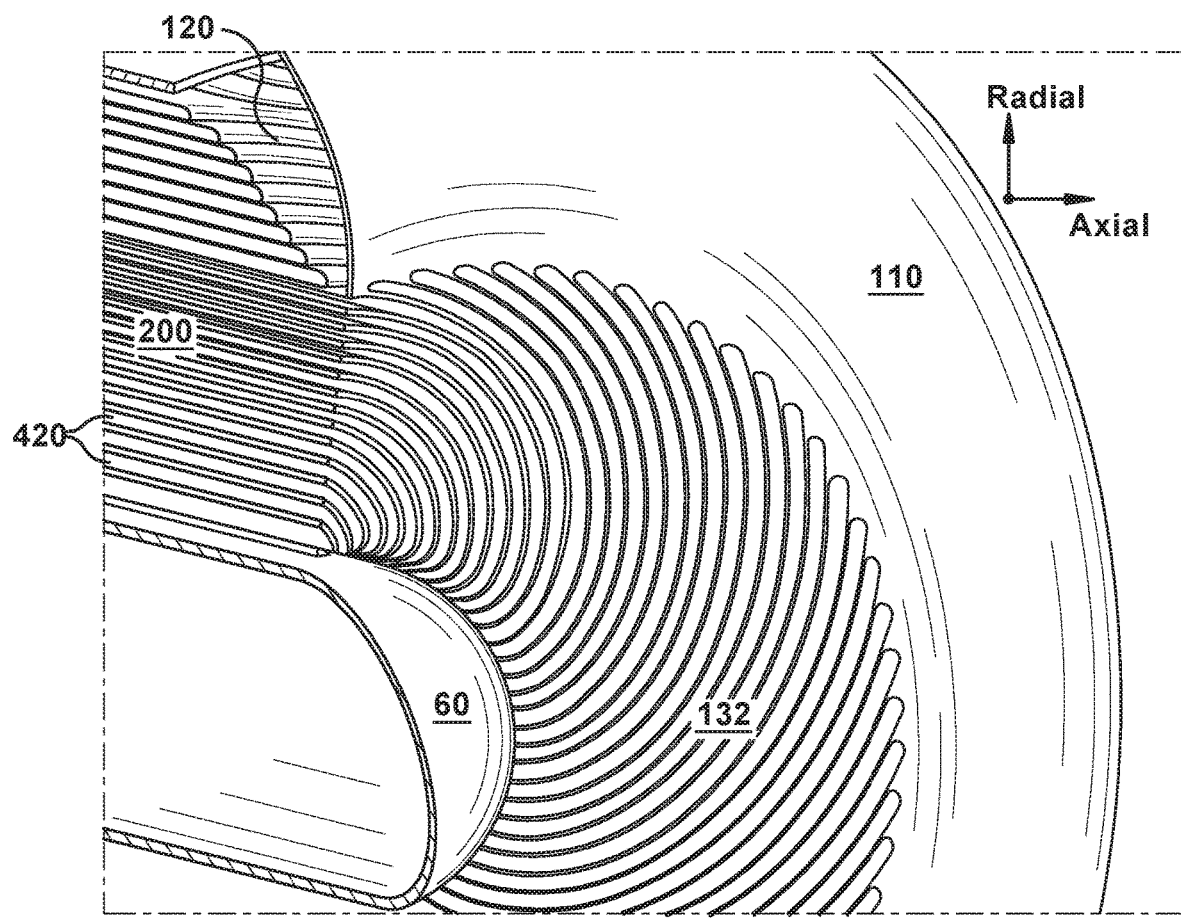
FIG. 9 illustrates an enlarged, partial perspective view of the turbine exhaust outlet, according to an aspect of the present disclosure.

FIG. 9 illustrates an enlarged, partial perspective view of the turbine exhaust outlet 132. The hot side outlet manifold guides the flow from the heat exchanger core 200 to the ambient. The turbine exhaust outlet 132 is an axial extension of the heat exchanger core spiral walls, with a taper of approximately 45 degrees in an axial-radial plane. The turbine exhaust exits through the parting plates and dissipates to the aft of the engine. Part of the turbine exhaust outlet 132 walls are adjacent to the entering cold compressed air. This provides additional heat exchanger function beyond the core of the heat exchanger.

Conventionally manufactured heat exchangers are typically rectangular or cylindrically shaped. The primary reason is that for reasonable cost material and machinery, those shapes are available and convenient. Additive manufacturing is far less limiting in this respect. If the design can fit within the build zone, and the features such as build angles and dimensional tolerances are kept within additive capabilities, manufacturing complex shapes is not different than manufacturing simple shapes. An additively built recuperator enables high performance of engines. The recuperator effectiveness must be high—so counterflow type heat exchangers result in smaller and lighter designs compared to other flow configurations. Additive manufacturing allows a compact design with the compressor air entering radially inward on one side of the heat exchanger while the turbine exhaust enters axially from the opposite side. Likewise, the compressor air exits the heat exchanger axially toward the machine's upper radius, while the turbine exhaust exits axially. Additive manufacturing makes it simple to direct the air in and out of the heat exchanger. Additive manufacturing also allows the heat exchanger core to be built as an annulus, following the natural entrance and exit flow lines of the compressor and turbine air. This reduces irreversible losses that would occur if the flow had to be expanded, directed, and decelerated for the use of a conventional heat exchanger.

Braze and weld joints are primary sources of heat exchanger failure. The stress concentrating nature of these joints, coupled with the deleterious effects of braze and welding on parent material properties, affects traditional heat exchanger plates, fins, and manifolds. Additive manufacturing allows for a monolithic build that eliminates, or at least greatly reduces, braze and weld joints. An engine as described herein may feature a bolted flange and a self-centering leaf seal to attach to the engine structure, with no welded manifolds. The heat exchanger described herein has no braze joints, and the monolithic material by definition has 100% internal conductivity, without the porous areas of disbond that reduce the theoretical effectiveness of fabricated heat exchangers.

Compact heat exchangers fundamentally require small flow passages. With small flow passages, the heat transfer surface area to heat exchanger volume ratio is maximized. There are two limitations to the flow size passage—manufacturing capability and pressure drop allowance. For example, fin spacings as fine as 0.01 inch or less may be built using additive machines and material. Additive manufacturing also enables the shape of the parting plates and fins to be optimized such that the distance between plates can be kept constant, and the fin spacing can be kept constant. Constant cross-sectional area results in even flow distribution and minimal irreversible pressure losses due to flow acceleration and deceleration. The intersection angle of the fins to the plates can be tailored for the most use of available volume. A heat exchanger structure with angled or curved cooling fins would not be possible with conventional (i.e., non-additively manufactured) heat exchanger fabrication techniques. Finally, since an additively manufactured heat exchanger does not require any brazing or adhesives such as epoxy to mechanically connect the fins to the plates, there is no additional thermal resistance associated with the interconnections, every ounce of heat exchanger material is used to transfer heat and improve engine performance.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. The terms "about" and "approximately" as applied to a particular value of a range applies to both values, and unless otherwise dependent on the precision of the instrument measuring the value, may indicate +/-10% of the stated value(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A recuperator comprising:
   a monolithic heat exchanger core having a first side proximal to a combustor inlet and turbine outlet, and a second side axially opposed to the first side;
   a compressed air inlet located on the second side and at a radially outer portion of the second side of the heat exchanger core, the compressed air inlet configured to receive air axially through the second side;
   a compressed air outlet located on the first side and at a radially outer portion of the first side of the heat exchanger core, the compressed air outlet configured to discharge the air axially out through the second side for supplying the air to a combustor;
   a first plurality of passageways connecting the compressed air inlet to the compressed air outlet;
   a turbine exhaust inlet located on the first side and radially inward of the compressed air outlet;
   a turbine exhaust outlet located on the second side and radially inward of the compressed air inlet; and
   a second plurality of passageways connecting the turbine exhaust inlet to the turbine exhaust outlet;
   wherein the first plurality of passageways and the second plurality of passageways are defined by parting plates that extend radially outward in a spiral pattern that maintains a substantially equal distance between adjacent parting plates, and wherein each of the first plurality of passageways is adjacent to one of the second plurality of passageways.

2. The recuperator of claim 1, wherein the first plurality of passageways includes a radially outer passageway and a radially inner passageway, the radially outer passageway having a shorter axial length than the radially inner passageway, wherein the resulting configuration of the compressed air inlet is tapered in an axial-radial plane.

3. The recuperator of claim 2, wherein the compressed air inlet is tapered by about 45 degrees in the axial-radial plane.

4. The recuperator of claim 1 further comprising a combustor inlet plenum located adjacent the compressed air outlet and radially outward from the turbine exhaust inlet, the combustor inlet plenum configured to direct the air from the compressed air outlet to the combustor, wherein the compressed air outlet is tapered by about 45 degrees in an axial-radial plane.

5. The recuperator of claim 1, wherein the parting plates are joined by a plurality of fins, and wherein the fins increase thermal transfer to the parting plates.

6. The recuperator of claim 5, wherein the fins are formed at a variable angle comprising a curved surface with respect to the parting plates.

7. The recuperator of claim 1, further comprising:
   an outer casing located radially outward of the heat exchanger core, the outer casing directing compressed air axially aft to the compressed air inlet.

8. A gas turbine engine comprising:
   a compressor;
   a combustor fluidly connected with the compressor;
   a turbine fluidly connected with the combustor;
   a recuperator fluidly connected to the compressor and the combustor, the recuperator comprising:
   a monolithic heat exchanger core having a first side proximal to a combustor inlet and turbine outlet, and a second side axially opposed to the first side;
   a compressed air inlet located on the second side and at a radially outer portion of the second side of the heat exchanger core, the compressed air inlet configured to receive air axially through the second side;
   a compressed air outlet located on the first side and at a radially outer portion of the first side of the heat exchanger core, the compressed air outlet configured to discharge the air axially out through the first side for supplying the air to the combustor;

a first plurality of passageways connecting the compressed air inlet to the compressed air outlet;
a turbine exhaust inlet located on the first side and radially inward of the compressed air outlet;
a turbine exhaust outlet located on the second side and radially inward of the compressed air inlet; and
a second plurality of passageways connecting the turbine exhaust inlet to the turbine exhaust outlet;
wherein the first plurality of passageways and the second plurality of passageways are defined by parting plates that extend radially outward in a spiral pattern that maintains a substantially equal distance between adjacent parting plates, and wherein each of the first plurality of passageways is adjacent to one of the second plurality of passageways.

9. The gas turbine engine of claim 8, wherein the first plurality of passageways includes a radially outer passageway and a radially inner passageway, the radially outer passageway having a shorter axial length than the radially inner passageway, wherein the resulting configuration of the compressed air inlet is tapered in an axial-radial plane.

10. The gas turbine engine of claim 9, wherein the compressed air inlet is tapered by about 45 degrees in the axial-radial plane.

11. The gas turbine engine of claim 8 further comprising a combustor inlet plenum located adjacent the compressed air outlet and radially outward from the turbine exhaust inlet, the combustor inlet plenum configured to direct the air from the compressed air outlet to the combustor, wherein the compressed air outlet is tapered by about 45 degrees in an axial-radial plane.

12. The gas turbine engine of claim 8, wherein the parting plates are joined by a plurality of fins, and wherein the fins increase thermal transfer to the parting plates.

13. The gas turbine engine of claim 12, wherein the fins are formed at a variable angle comprising a curved surface with respect to the parting plates.

14. The gas turbine engine of claim 8, further comprising:
an outer casing located radially outward of the heat exchanger core, the outer casing directing compressed air axially aft to the compressed air inlet.

15. The gas turbine engine of claim 8, wherein the compressor is a centrifugal compressor.

16. A heat exchanger comprising:
a monolithic heat exchanger core having a first side and a second side axially opposed to the first side;
a first inlet located on the second side and at a radially outer portion of the second side of the heat exchanger core, the first inlet configured to receive air axially through the second side;
a first outlet located on the first side and at a radially outer portion of the first side of the heat exchanger core, the first outlet configured to discharge the air axially out through the first side;
a first plurality of passageways connecting the first inlet to the first outlet;
a second inlet located on the first side and radially inward of the first outlet;
a second outlet located on the second side and radially inward of the first inlet; and
a second plurality of passageways connecting the second inlet to the second outlet;
wherein the first plurality of passageways and the second plurality of passageways are defined by parting plates that extend radially outward in a spiral pattern that maintains a substantially equal distance between adjacent parting plates, and wherein each of the first plurality of passageways is adjacent to one of the second plurality of passageways.

17. The heat exchanger of claim 16, wherein the first plurality of passageways includes a radially outer passageway and a radially inner passageway, the radially outer passageway having a shorter axial length than the radially inner passageway, wherein the resulting configuration of the first inlet is tapered in an axial-radial plane.

18. The heat exchanger of claim 17, wherein the first inlet is tapered by about 45 degrees in the axial-radial plane, or the first outlet is tapered by about 45 degrees in an axial-radial plane.

19. The heat exchanger of claim 16, wherein the parting plates are joined by a plurality of fins, and wherein the fins increase thermal transfer to the parting plates.

20. The heat exchanger of claim 19, wherein the fins are formed at an angle to the parting plates, the angle comprising one of:
a right angle;
an acute or obtuse angle; or
a variable angle comprising a curved surface.

* * * * *